United States Patent

[11] 3,602,883

| [72] | Inventor | Juan Belart<br>Walldorf, Germany |
|---|---|---|
| [21] | Appl. No. | 808,588 |
| [22] | Filed | Mar. 19, 1969 |
| [45] | Patented | Aug. 31, 1971 |
| [73] | Assignee | International Telephone and Telegraph Corporation<br>New York, N.Y. |
| [32] | Priority | Mar. 28, 1968 |
| [33] | | Germany |
| [31] | | P 17 73 074.4 |

[54] TELLTALE DEVICE FOR DIFFERENTIAL PRESSURE
9 Claims, 5 Drawing Figs.

[52] U.S. Cl. .................................................. 340/52, 200/82
[51] Int. Cl. .................................................. B60q 1/44
[50] Field of Search .......................................... 340/60, 52, 52 C; 200/81.4, 82

[56] References Cited
UNITED STATES PATENTS

| 3,366,758 | 1/1968 | Bentzen et al. | 200/82 |
| 3,374,322 | 3/1968 | Miller | 200/82 |
| 3,427,582 | 2/1969 | Brandon | 340/52 |
| 3,439,139 | 4/1969 | Stelzer | 200/82 |
| 3,475,573 | 10/1969 | Maltais et al. | 200/82 |
| 3,450,443 | 6/1969 | Bueler | 303/6 |

Primary Examiner—Alvin H. Waring
Attorneys—C. Cornell Remsen, Jr., Walter J. Baum and Paul W. Hemminger ABSTRACT: A pressure-differential-indicating system which includes a cylinder connected between two compartments across which a pressure differential may develop, e.g. the chambers of a tandem master cylinder. A piston in the cylinder bore is displaceable from its intermediate position under the pressure differential to actuate a switch. The switch actuation occurs via an index ball spring-biased into a V-section recess of the piston in its intermediate position but adapted to rest in a further recess on either side of this intermediate recess when the piston is located in its off-normal position, the limiting recesses maintaining the switch in its actuated state even after the pressure differential has been redressed.

INVENTOR.
JUAN BELART
BY

ATTORNEY

INVENTOR.
JUAN BELART
BY
Karl F. Ross
ATTORNEY

TELLTALE DEVICE FOR DIFFERENTIAL PRESSURE

My present invention relates to an indicating system responsive to differential pressure and, more particularly, to a warning arrangement adapted to indicate failure in a dual-network brake system.

In a dual-network brake system, a tandem or twin master cylinder has a pair of master-cylinder compartments receiving brake fluid from a common reservoir or from respective reservoirs and pressurizable by respective pistons, commonly displaced by the brake pedal, to drive the brake fluid through respective transmission networks or hydraulic lines.

The transmission networks are connected to respective wheel brakes of the vehicle such that, upon failure off one network, the other may remain effective to operate the vehicle brakes. Various dual-network systems have been proposed heretofore. In one of these systems, the wheel brakes of each wheel have two wheel-brake cylinders, each of which is connected to one of the hydraulic transmission networks. In this system, failure of one network will nevertheless allow all of the wheel brakes to remain effective, albeit with reduced efficiency. In another arrangement, one front-wheel brake and the diagonally opposite rear-wheel brake are connected to one network while the other wheel brakes are tied to the other transmission network. Yet another arrangement couples both front-wheel brakes to one network and both rear-wheel brakes to another. This last system has the disadvantage that, with failure of one of the networks, only half the number of wheel brakes remains operatively.

To provide an early indication of the loss of braking effectiveness in one of the sets of wheel brakes or wheel-brake cylinders as a consequence of failure of one of the transmission networks, it has been proposed to provide indicating means operable by the master cylinder to alert the vehicle driver of the fact of such failure. In some systems, such alerting arrangements have made use of switches in one or both of the brake-fluid reservoirs to indicate the draining thereof and, consequently, the possibility of leak in the associated transmission network. Other arrangements have made use of the fact that the pistons of the master cylinders may move to a greater or lesser extent, when the corresponding network becomes ineffective, to control a switch mechanism.

It is an important object of the present invention to provide an improved indicating system for the failure of a transmission network in a dual-network brake system.

It may be noted also that others have provided indicating arrangements responsive to pressure differentials in a pair of compartments. Such systems, while they may respond to momentary development of a pressure differential beyond a predetermined limit, are incapable of maintaining an alert upon the removal or redress of such differential. Hence attempts to apply such systems to dual-network brakes have not proved wholly satisfactory inasmuch as the pressure differential across the transmission networks or master-cylinder compartments, which is attributable to failure in one of the networks, is eliminated as soon as the brake is released.

If the attention of the vehicle operator is fixed on the road during the braking process in which a pressure differential develops to provide a visual or audible indication of failure in one of the networks, the operator may not recognize the indication or signal, may not record or may not remember at some subsequent time that he has been alerted to the possible failure. It is, therefore, desirable that the indication of such failure be maintained even after the cause of the pressure differential has terminated, i.e. after the brake pedal has been released.

It is another object of this invention, therefore, to provide an electrical indicating system responsive to pressure differential which will maintain an electrical circuit in its triggered state even after the pressure differential has been redressed.

A further object of this invention is to provide, in a dual-network brake system of the character described, a warning system responsive to failure in one of the networks which will provide a continuous indication of that fact to the operator without complex electrical circuitry and responsive means.

It is a further object of this invention to provide an alerting system for the purposes described which can be built into the master cylinder at low cost, requires little space beyond that generally occupied by the master cylinder and is practically foolproof.

The present invention is based upon the fact that, especially in tandem master cylinders of dual-network automotive brakes, a considerable pressure differential develops across the two compartments of the master cylinder upon failure of one of the networks or the occurrence of some defect which renders the wheel brakes of one of the networks ineffective. It may be noted that this differential, which appears during braking, disappears as soon as braking has terminated, but the need for signalling an indication of the defect to the operator remains important.

According to the present invention, a piston-cylinder arrangement is connected between a pair of compartments across which the pressure differential is to be defected, the piston and cylinder arrangement having a piston with an intermediate position retained by a detent which may be cammed by the piston outwardly to allow the piston to shift from its intermediate position (corresponding to zero pressure differential or pressure differentials below a predetermined level) into extreme positions representing pressure differentials in one or the other direction exceeding the predetermined level. The detent, according to this invention, operates a switch which triggers an electrical warning circuit, including a light or other optical means or a sound generator or other audible means for indicating the existence of this pressure differential at a remote location, e.g. the instrument panel, dashboard or operator compartment of the vehicle.

According to an important feature of this invention, the piston is provided with a pair of limiting recesses flanking the intermediate recess and engaged by the detent in the limiting positions of the piston whereby the switch remains operated by the detent even in the limiting recesses to maintain the signal even after the differential has been eliminated.

According to a more specific feature of this invention, the cylinder for this differential-detecting arrangement is constituted by a bore parallel to the master-cylinder bore and spanning the master-cylinder compartments while being connected to these compartments via passages in the master cylinder transverse to the bore and the master cylinder. The differential-pressure piston is slidable in this bore and has centrally therealong a relatively deep camming recess with, preferably, inclined camming flanks whereby a spring-loaded detent may retain the piston in its intermediate position. The detent is according to this invention a spring-loaded ball receivable in the intermediate recess and a pair of limiting recesses on either side of the intermediate recess. The limiting recesses, according to this invention, have depths which are less than that of the intermediate recess so that the switch operated by the ball remains in its operated state even when the ball enters one of these limiting recesses.

The electrical switch, according to the present invention, has a pin or tappet bearing upon a seat for the ball and cooperating with a compression spring bearing upon the latter and urging the ball into the recesses against the differential-pressure piston.

The simplest method uses a normally open switch which breaks an electrical circuit between an indicating lamp on the dashboard or instrument panel of the vehicle when the detent ball is in its intermediate position but closes this circuit between the vehicle battery and the lamp when the ball is pressed out of the intermediate recess and while the ball is lodged in one of the limiting recesses.

For safety reasons, it may be desirable to use a normally closed switch which opens when the ball is in one of its limiting recesses. Thus the lamp may be illuminated when the ignition switch is closed to indicate the operativeness of the circuit and the proper functioning of the lamp.

As noted earlier, the intermediate recess has a V-section profile. Advantageously, the intermediate recess is generally in the form of a circular groove having frustoconical ramps rising outwardly from the trough of the groove and thus diminishing in length from the exterior toward the interior. The slope of the walls of the groove and the stiffness of the spring determine, together with the effective cross section of the differential piston, the threshold pressure differential at which the ball is cammed out of the groove by movement of the differential-pressure piston and thus the differential pressure at which triggering of the electrical circuit occurs.

The side or limiting recesses may also be in the form of circular grooves of such shape and depth that the ball engaged therein retains the piston in the corresponding extreme position even after decrease of the pressure differential below the threshold value so that the switch remains triggered. The depth of the limiting grooves is less than that of the intermediate grooves and preferably the limiting grooves are bounded by steep flanks or shoulders which prevent the ball from rebounding into the intermediate groove.

According to a further feature of this invention, the master cylinder is integrally provided with the bore of the differential-pressure piston and with a fitting perpendicular to this bore and receiving the switch. The fitting may define another cylindrical bore perpendicular to this differential-pressure piston and the bore receiving same.

Yet another feature of this invention resides in the provision of abutments in the bore on opposite sides of the differential-pressure piston and engageable therewith in its limiting position so that the differential pressure capable of moving the piston need not be taken up fully by the ball but is expanded against these abutments. Consequently the ball and the grooves cooperating therewith need not themselves bring about the force necessary to retain the differential-pressure piston in the limiting positions. When the differential-pressure bore is formed directly in the body of the tandem-master cylinder, parallel to the chambers thereof, it can be connected through relatively which cross bores to the working compartments, thereby facilitating manufacture of the assembly and imparting relatively small measurements to the unit.

The above and other objects, features and advantages of the present invention will become more readily apparent from the following description, reference being made to the accompanying drawing in which.

Figure 3:
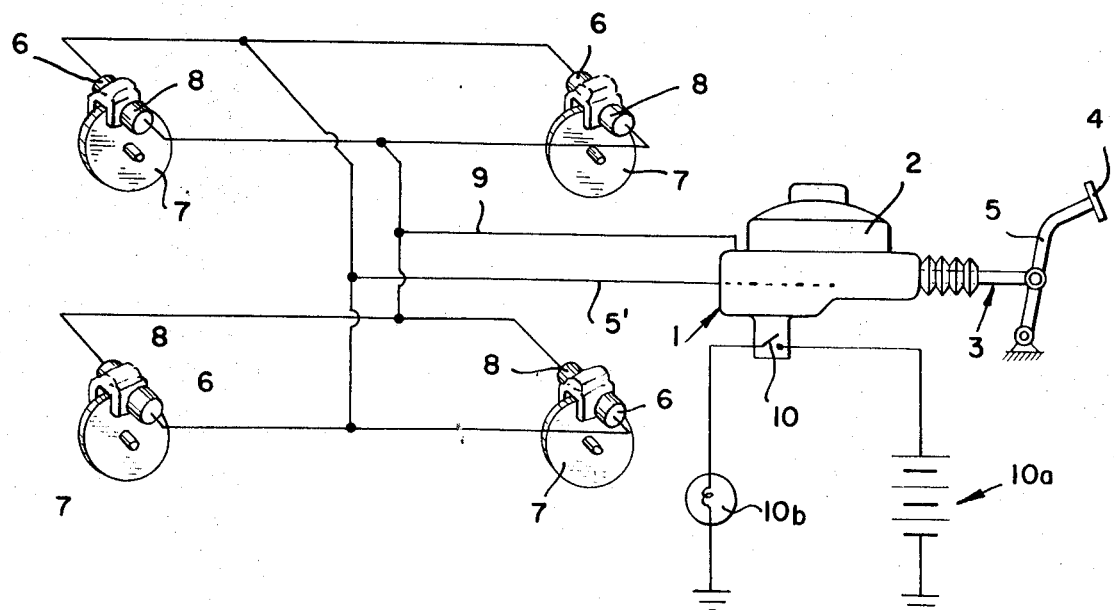
FIG. 3 is a diagram of a dual-brake system provided with a unit of the type shown in FIGS. 1 and 2.

Referring first to FIG. 3, it will be seen that a dual-network brake system in accordance with the present invention comprises a tandem-master cylinder 1 having a dual-chamber brake fluid reservoir 2 and piston 3 connected to the brake pedal 4 by a link 5.

From the working compartment of he tandem-master cylinder 1 proximal to the brake pedal 4, a hydraulic transmission line 5 delivers brake fluid to the outside wheel-brake cylinders 6 of disk brakes mounted on each of the four vehicle wheels. The disks associated with the disk brakes are represented at 7. Also flanking the disks are the inner wheel-brake cylinders 8 which are connected in another transmission network 9 to the distal working compartment of the tandem-master cylinder.

The switch of the differential-pressure device is here shown diagrammatically as the normally open contacts 10 which are connected in series between one terminal of the ignition battery 10a and the lamp 10b which may be disposed on the instrument panel of the vehicle. The other terminals of the battery 10a and of the lamp 10b are grounded. Thus when a pressure differential develops in the tandem-master cylinder 1 indicative of the failure in one of the networks 5' or 9 switch 10 is closed to illumine the lamp 10b and warn the vehicle operator.

Figure 4:
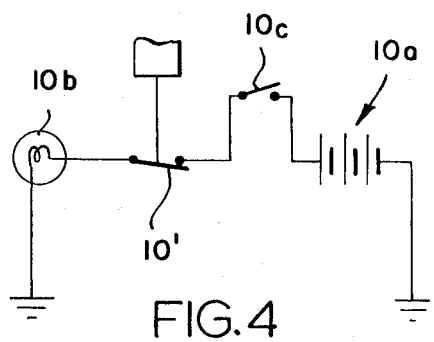
FIG. 4 is a circuit diagram showing another way in which the switch may be connected.

In the modified circuit of FIG. 4 the switch 10', which is a normally closed switch, is opened upon the development of a pressure differential exceeding the threshold value to disconnect the battery 10a from the lamp 10b. In this arrangement, the ignition switch 10c may also be connected in circuit so that the lamp 10b is lit when the ignition of the vehicle is turned on.

The tandem-master cylinder 1 comprises a body 13 formed with a master-cylinder bore 1a receiving a primary master-cylinder piston 14 having a primary cup 14a and cooperating with the inlet port 14b and an equalization or bypass port 14c leading from a dual-chamber reservoir 2 as previously described. The primary piston 14 is adapted to pressurize fluid in the working chamber 17 and can be shifted to the left against a primary compression chamber 15 seated on a spring plate 15a against a shoulder 14d of the primary piston. A stem 14e of the primary piston 14 has a head 14f received in a sleeve 11 which constitutes a stroke-limiting mechanism interposed between the primary piston 14 and the secondary or floating piston 12. An abutment 11a in the sleeve 11 and on the secondary piston 12 is engaged by the head 14f when the piston 14 shifts in its direction without developing pressure in chamber 17 as a consequence of failure in transmission network 5.

Figure 1:
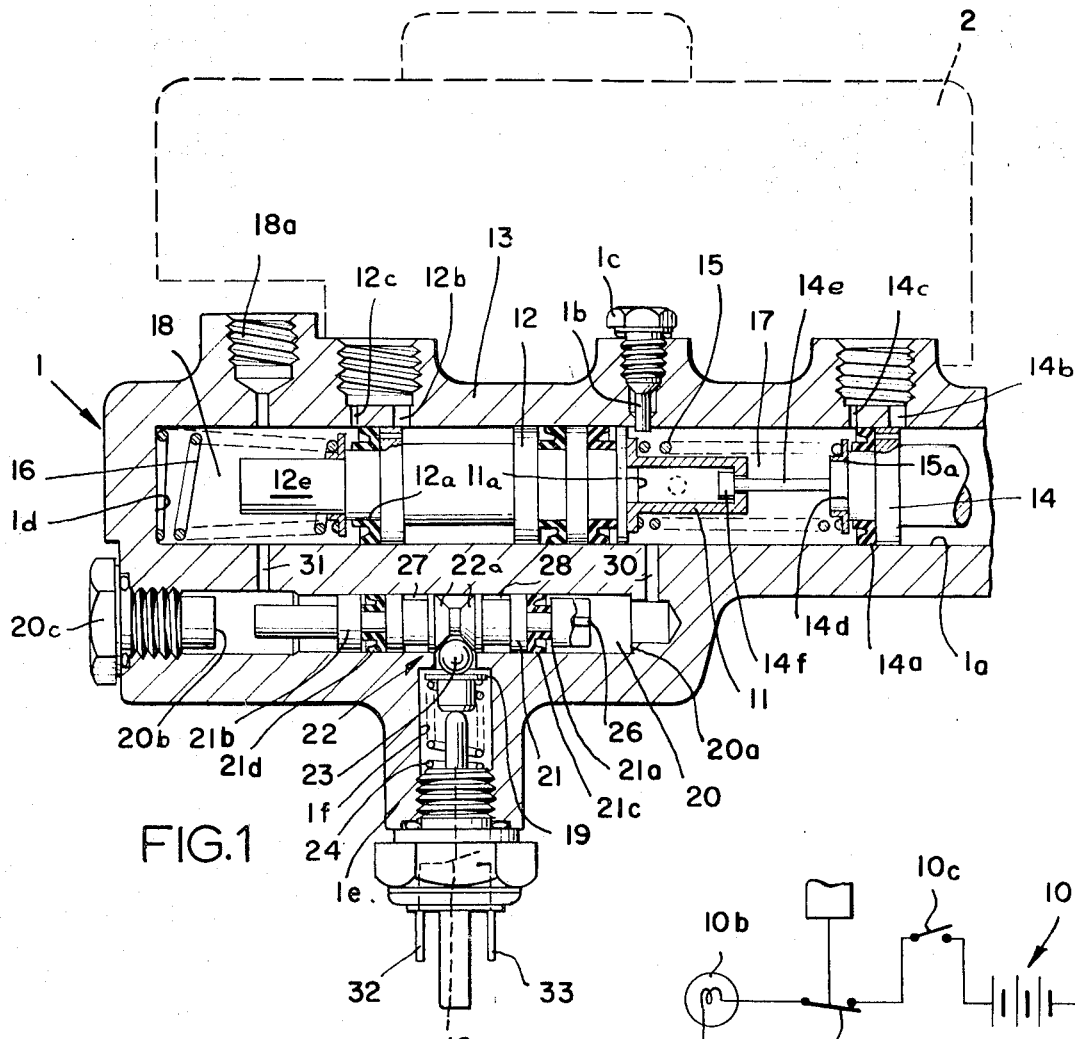
FIG. 1 is an axial cross sectional view of a master cylinder embodying the present invention.

The floating piston 12 has a primary cup 12a cooperating with the inlet port 12b and the bypass port 12c connected to the other compartment of the reservoir 2 and is adapted to develop braking pressure in the working chamber 18 of the master cylinder. The latter is connected via a port 18a to the other transmission network 9 and receives a compression spring 16 which bears against piston 12 and serves to return it to its normal position as shown in FIG. 1, this position being limited as well be the stem 1b of a venting valve 1c which may be withdrawn to connect chamber 17 to atmospheric pressure. A stem 12e on the floating piston 12 is adapted to abut the end wall 1d of bore 1a when the floating piston is shifted to the left in the absence of pressure within chamber 18. The initial distance between the primary piston 14 and the secondary piston 12 is determined by the compression spring 15 which is stiffer than spring 16.

Below the master-cylinder bore 1a, in accordance with the present invention, there is provided a differential-pressure bore 20 connected at its ends by cross bores 30 and 31 to the working chambers 17 and 18. A differential-pressure piston 21 is slidably parallel to the master-cylinder piston within the differential-pressure bore. The piston 21 has a pair of heads 21a and 21b with respective gland-type seals 21c and 21d engaging the walls of the bore 20. Between these heads 21a and 21b, the piston is provided centrally with an intermediate circular groove 22 whose frustoconical walls 22a converge inwardly and engage a detent ball 23. The detent ball is held by a plate 19 against the differential-pressure piston 21.

The apparatus also includes a fitting 1c integral with the master-cylinder body and provided with a bore 1f perpendicular to the bore 20 and receiving the plate 19 against which a compression spring 24 is set under prestress. The prestress is developed by threading a switch body 10 into the fitting 1e to act as the other spring set.

A stem or tappet 29 may be positively connected to the plate 19 and also acts as an actuating member for the switch 10 whose electrical connectors 32 and 33 are blades which can be connected to the circuit by the positioning of a female connector thereon in the usual manner.

Figure 5:
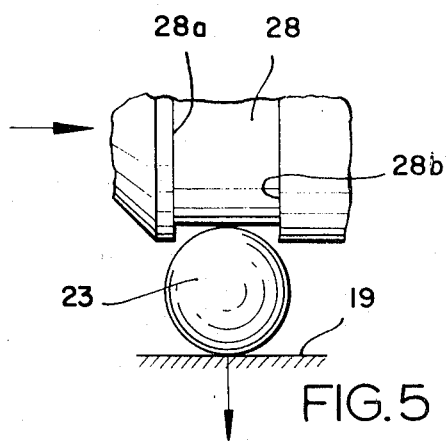
FIG. 5 is a detail view of the ball in the limiting position of the piston.

To either side of the intermediate groove 22, the differential-pressure piston is formed with a pair of limiting or side circular grooves 27 and 28 of such depth that the ball 23, when received therein (FIG. 5) maintains the switch 10 in its actuated condition. The flanks of these grooves, e.g. as shown at 28a and 28b are shoulders lying in planes perpendicular to the axis of the differential-pressure piston and designed to prevent the ball 20 from being cammed out of these limiting grooves during consequent brake operation, in spite of the failure of one of the networks. The bore 20 is provided with a cruciform stop member 26 engageable with the end 20a of the bore 20 when the piston 21 is in its right-hand limiting position, while a stem 25 on the piston is engageable with an abutment 20b formed on a plug 20c threaded into the open end of the bore 20.

With normal brake operation, the actuation of the brake pedal 4 shifts the pistons 14 and 12 to the left developing pressure substantially equally in the working chambers 17 and 18 and transmitting the pressure via the respective networks 5 and 9 to the wheel-brake cylinder 6, 7. Since there is no appreciable differential pressure across the piston 21, the latter remains in its intermediate position in which the ball 23 is lodged in the recess 22 and the switch 10 remains open.

Figure 2:
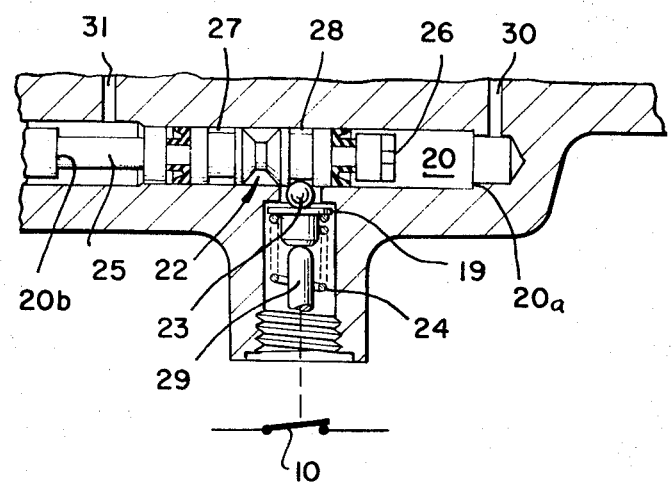
FIG. 2 is a corresponding section through the differential-pressure bore showing the differential-pressure piston in a limiting position.

Should a failure develop in network 9 or one of the wheel-brake cylinders 7 associated therewith, a pressure differential exceeding the threshold value and result as the floating piston 12 is brought to bear upon the stop 1d and piston 14 continues to move to the left. The same differential is applied across the piston 21 and displaces the latter to the left (FIG. 2), camming the ball 23 radially outwardly and actuating the switch 10. The piston 21 is driven into its limiting position in which the stem 25 engages abutment 20b, whereupon the bore 23, under the action of spring 24 moves radially inwardly into the recess 28, the switch 10 remaining actuated. Closure of switch 10 with the initial camming of the bore 23 out of groove 22 illuminates the lamp 10b which remains lit until the mechanism is reset.

Similarly, a failure in network 5 will result in a loss of pressure in chamber 17, whereupon floating piston 12 is driven to the left initially by spring 15 and then by the stem 14 until he pressure in chamber 18 suffices to operate network 9 and the associate wheel-brake cylinders. The pressure differential thus developed drives piston 21 to the right, thereby lodging the ball 23 in groove 27. When the ball 23 is in the groove 27c, 28, it retains the piston 21 in the corresponding limiting condition in spite of release of the brake pedal. Hence a warning or indication is given even on momentary operation of the brakes (in the event of failure), which remains until the mechanism is reset without impeding the normal response of the system to failure in one or another of the networks.

The repairman may reset the device, in the case of a retained position as shown in FIG. 1, by opening the bleed valve 1c and generating a pressure in excess of the normal brake pressure in chamber 18 to drive the piston to the right until the differential-pressure piston returns to its intermediate position in which the ball 23 engages the groove 22. By withdrawing plug 20c, the chamber 18 may be vented when the piston 21 in its extreme right-hand position to allow pressure in chamber 14 to shift the piston 21 back to its intermediate position.

The improvement described and illustrated is believed to admit of many modifications within the ability of persons skilled in the art, all such modifications being considered within the spirit and scope of the invention except as limited by the appended claims.

1. A differential-pressure indicating system responsive to a pressure differential between two chambers beyond a threshold differential, said system comprising means forming a differential-pressure bore communicating at opposite sides with said chambers, a differential-pressure piston slidably received in said bore, detent means cooperating with said piston for retaining same in an intermediate position at differential pressures across said chambers below said threshold and in limiting positions to either side of said intermediate position upon the application of a pressure differential to said piston in a corresponding direction above said threshold, and indicating means including switch means cooperating with said detent means and operable upon movement of said piston from said intermediate position to one of said limiting positions and while said piston remains in said one of said limiting positions for signaling the development of said differential above said threshold, said piston being formed with a relative deep intermediate recess and a pair of relatively shallow side recesses axially offset of opposite sides of said intermediate recess, said detent means including a spring-loaded stop ball operatively connected with said switch means and biased in the direction of said piston for engagement in said recesses, said ball entering said intermediate recess to return said switch means in one operating condition while resisting displacement of said piston until said threshold differential is attained and thereafter entering one of said side recesses to a lesser extent to maintain said piston in an extreme position and said switch means in another operative position.

2. The system defined in claim 1 wherein said intermediate recess is a circumferential groove having a pair of inwardly converging frustoconical flanks and said side recesses are circumferential grooves having flanks engageable with said ball to retain said piston in the corresponding limiting position.

3. The system defined in claim 2, further comprising a second bore formed therein at right angles to the first-mentioned bore and receiving said ball, said detent means further comprising a plate in said second bore resting against said ball, a compression spring received in said second bore under prestress and bearing on said plate, and a tappet engaging said plate and extending through said second bore, said switch means including a switch means including a switch mounted in said second bore and actuable by said tappet.

4. The system defined in claim 2, further comprising a pair of stops formed in said bore on opposite sides of said piston and engageable therewith in the limiting positions of said piston.

5. The system defined in claim 2 wherein said chambers are the hydraulic working chambers of a tandem master cylinder having a body, said bore being formed in said body parallel to the tandem master cylinder.

6. The system defined in claim 5, further comprising a pair of cross bores formed in said body and connecting the first-mentioned bore at its ends to said chambers.

7. The system defined in claim 6, further comprising means for venting one of said chambers selectively whereby pressure generated in the unvented chamber serves to return said piston into its intermediate position.

8. The system defined in claim 7 wherein said indicating means includes an electrically operated warning device on the instrument panel of an automotive vehicle having a dual-network brake system provided with said tandem master cylinder, said vehicle having an ignition battery, said switch means being connected in circuit between said battery and said device.

9. The system defined in claim 8 wherein said tandem master cylinder is provided with a primary piston shiftable by the vehicle operator and received in one of said chambers, a secondary piston displaceable by said primary piston and received in the other of said chambers, respective springs in said chambers bearing upon said primary and secondary pistons to resist displacement thereby by said operator, stroke limiting means between said primary piston and said secondary piston for directly coupling them upon failure of fluid pressure in the chamber of said primary piston, and stop means on said body engageable by said secondary piston for limiting the displacement thereof upon the failure of fluid pressure in the chamber of said secondary piston, said bore being provided with a pair of stops on opposite sides of said differential-pressure piston and engageable thereby in said limiting positions thereof, said body being formed with a fitting perpendicular to said bore and to said pistons and communicating with said bore while receiving said ball, said switch means including a switch threaded into said fitting, a plate bearing on said ball and spaced from said switch, a compression spring against said plates and said switch under precompression, and a tappet connecting said plate with said switch for actuating same.